US012797301B2

(12) United States Patent
Wang

(10) Patent No.: US 12,797,301 B2
(45) Date of Patent: *Nov. 17, 2026

(54) AUTOMATIC PUSHING TYPE COMPLEMENTARY FOOD DEVICE

(71) Applicant: Beijing Shenchuang Century Information Technology Co., Ltd., Beijing (CN)

(72) Inventor: Hao Wang, Beijing (CN)

(73) Assignee: Beijing Shenchuang Century Information Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/070,744

(22) Filed: Mar. 5, 2025

(65) Prior Publication Data

US 2025/0221893 A1 Jul. 10, 2025

Related U.S. Application Data

(63) Continuation of application No. 17/756,385, filed as application No. PCT/CN2020/125874 on Nov. 2, 2020, now Pat. No. 12,263,138.

(30) Foreign Application Priority Data

Nov. 26, 2019 (CN) ......................... 201911175724.9
Nov. 26, 2019 (CN) ......................... 201922084848.8

(51) Int. Cl.
*A61J 9/04* (2006.01)
*A61J 17/00* (2006.01)

(52) U.S. Cl.
CPC ................. *A61J 9/04* (2013.01); *A61J 17/10* (2020.05)

(58) Field of Classification Search
CPC .................................... A61J 9/04; A61J 17/10
See application file for complete search history.

(56) References Cited

U.S. PATENT DOCUMENTS 2,612,165 A 9/1952 Szuderski
2,824,561 A 2/1958 Mueller
(Continued)

FOREIGN PATENT DOCUMENTS

CN 202236419 U 5/2012
CN 203244604 U 10/2013
(Continued)

OTHER PUBLICATIONS

CNIPA, International Search Report issued in IA No. PCT/CN2020/125874, dated Jan. 29, 2021.

*Primary Examiner* — Tri M Mai
(74) *Attorney, Agent, or Firm* — Ingrassia Fisher & Lorenz, LLP | IFL

(57) ABSTRACT

An automatic pushing type complementary food device which includes a clamping body, an elastic member and a colander, wherein the inner side of the clamping body is connected to one end of an elastic member in a clamped manner, the outer side of the clamping body is connected to the colander in a clamped manner, the other end of the elastic member extends into the colander, a complementary food cavity is provided in the colander, and overflow holes are provided in the outer wall of the colander. The automatic pushing type complementary food device is simple in structure, convenient to operate, capable of automatically pushing and collecting complementary food when a baby uses the device, free of auxiliary operation by a mother, capable of bringing convenience to the mother during feeding, capable of achieving automatic collection of the complementary food without a complex pushing structure, easy to clean and not prone to creating the situation that the baby mistakenly eats the complementary food, the usage experience can be improved while the safety of the baby in use can be guaranteed, and the characteristics of simple structure, (Continued)

convenience in operation, safety in use and good usage experience are achieved.

2 Claims, 4 Drawing Sheets

(56) References Cited

U.S. PATENT DOCUMENTS

| | | | | |
|---|---|---|---|---|
| 5,947,427 | A | 9/1999 | Holmquist | |
| 9,717,656 | B2 * | 8/2017 | Lo | A61J 9/005 |
| 12,263,138 | B2 * | 4/2025 | Wang | A47G 21/00 |
| 2008/0319479 | A1 * | 12/2008 | Murphy Matro | A61J 17/001 606/234 |
| 2010/0140204 | A1 | 6/2010 | Vischer | |
| 2013/0299502 | A1 | 11/2013 | Lo | |
| 2014/0074165 | A1 | 3/2014 | Paxson et al. | |
| 2017/0095406 | A1 * | 4/2017 | Hakim | A61J 17/113 |
| 2019/0254933 | A1 | 8/2019 | Lake | |

FOREIGN PATENT DOCUMENTS

| | | | |
|---|---|---|---|
| CN | 203291253 | U | 11/2013 |
| CN | 103705386 | A * | 4/2014 |
| CN | 104257506 | A | 1/2015 |
| CN | 204147287 | U | 2/2015 |
| CN | 204745014 | U | 11/2015 |
| CN | 206063432 | U | 4/2017 |
| CN | 206443930 | U | 8/2017 |
| CN | 107913187 | A | 4/2018 |
| CN | 108606929 | A | 10/2018 |
| CN | 209033219 | U | 6/2019 |
| CN | 110025491 | A | 7/2019 |
| CN | 211212485 | U | 8/2020 |
| DE | 202004001195 | U1 | 5/2004 |
| WO | 2012146884 | A | 11/2012 |

* cited by examiner

AUTOMATIC PUSHING TYPE COMPLEMENTARY FOOD DEVICE

CROSS-REFERENCE TO RELATED APPLICATION

This application is a continuation of application Ser. No. 17/756,385, filed May 24, 2022, which is the National Stage of International Application No. PCT/CN2020/125874, filed Nov. 2, 2020, which was published under PCT Article 21(2) and which claims priority to Chinese Application No. 201911175724.9, filed Nov. 26, 2019, and claims priority to Chinese Application No. 201922084848.8, filed Nov. 26, 2019, which are all hereby incorporated in their entirety by reference.

BACKGROUND

Field of Invention

The present invention belongs to the field of infant products, and more particularly, the present invention relates to an automatic pushing type complementary food device.

Background of the Invention

The complementary food device is a tool for feeding baby with complementary food in it, and the complementary food overflows during the baby's sucking and biting, thus achieving the feeding effect. As the baby sucks, the complementary food in the complementary food device gradually decreases, and eventually there will be food residues. The way to solve the problem of food residue in the traditional complementary food device is to push it manually, which requires the assistance of the mother to push it when the baby eats complementary food with the complementary food device, and the tedious operation will bring a lot of inconvenience to the mother. In addition, relying on manual pushing to solve the food residue solution makes the structure of the complementary food device extremely complicated, and it is not easy to assemble and clean, not to mention the guarantee that all accessories are food-grade materials, also, there is the risk of accidental ingestion by the baby.

SUMMARY

The present invention provides a automatic pushing type complementary food device, which can not only solve the technical problem of inconvenience in operation of the complementary food device in the prior art, but also solve the technical problem of complicated structure of the complementary food device in the prior art.

In order to solve the above-mentioned problems, the present invention provides an automatic pushing type complementary food device, and the technical solution thereof is as follows:

An automatic pushing type complementary food device comprising a clamping body, an elastic member and a colander, wherein an inner side of the clamping body is connected to one end of the elastic member in a clamped manner, an outer side of the clamping body is connected to the colander in a clamped manner, the other end of the elastic member extends into the colander, a complementary food cavity is provided in the colander, and overflow holes are provided in an outer wall of the colander.

As the above-mentioned automatic pushing type complementary food device further preferably: an air hole penetrating the clamping body is provided on the clamping body, and a cavity communicating with the air hole is provided on the elastic member.

As the above-mentioned automatic pushing type complementary food device further preferably: the clamping body is a cylinder structure with a top cover provided at the top and an opening provided at the bottom thereof, an arc-shaped protrusion and the air hole are provided at the axis of the cylinder structure, and the wall thickness of the top cover at the air hole is greater than the wall thickness at the periphery of the air hole.

As the above-mentioned automatic pushing type complementary food device further preferably: a first clamping protrusion is provided at the outer side of the clamping body, and a second clamping protrusion is provided at the inner side of the clamping body; the first clamping protrusion is located above the second clamping protrusion.

As the above-mentioned automatic pushing type complementary food device further preferably: the inner diameter of the clamping body at the second clamping protrusion is smaller than the inner diameter of the colander.

As the above-mentioned automatic pushing type complementary food device further preferably: the cross section of the first clamping protrusion is a right-angled trapezoid; the cross section of the second clamping protrusion is a right-angled trapezoid.

As the above-mentioned automatic pushing type complementary food device further preferably: one end of the elastic member provided with the cavity is a clamping end, the other end of the elastic member is a free end, the clamping end and the free end are connected via a toothed sidewall.

As the above-mentioned automatic pushing type complementary food device further preferably: the surface of the outer sidewall of the free end of the elastic member is a corrugated surface, and the top end of the corrugated surface is adhered to the inner wall of the colander.

As the above-mentioned automatic pushing type complementary food device further preferably: the outer tip thickness of the toothed sidewall is greater than the inner tip thickness.

As the above-mentioned automatic pushing type complementary food device further preferably: further comprising an outer cover, the bottom of the outer cover is provided with a base, and the outer cover is sleeved on the outer side of the colander and is connected to the colander in a clamping manner.

As the above-mentioned automatic pushing type complementary food device further preferably: the colander includes a colander main body and a connecting piece, the connecting piece is in clamping fit with the clamping body, the colander main body is movably connected or fixedly connected with the connecting piece; the colander main body includes a mating section and a feeding end; the mating section is a rotary body for sliding mate with the elastic member; the feeding end is a shuttle body with an oblong cross section, and the sidewall is provided with the overflow holes for overflowing complementary food.

As the above-mentioned automatic pushing type complementary food device further preferably: the colander main body is movably connected to the connecting piece, and the colander main body further comprises a clamping end, wherein the clamping end is connected to the mating section, and the clamping end is clamped at inner side of the connecting piece.

As the above-mentioned automatic pushing type complementary food device further preferably: the colander main body is fixedly connected to the connecting piece, and the colander main body further comprises a coating end, wherein the coating end is connected to the matching section, and the coating end is connected to the outer side of the connecting piece by encapsulation and is provided integrally with the connecting piece.

As the above-mentioned automatic pushing type complementary food device further preferably: the oblong major axis diameter of the largest cross section of the feeding end is greater than the diameter of the cross section of the mating section; and the sidewall of the feeding end is arranged with a plurality of annular recesses which are in conformity with the arc shape of the baby teeth, the surface of the annular recesses is arc-shaped, and a plurality of the overflow holes are located in the annular recesses, and distributed in one large and one small array along the annular recesses on the upper and lower surfaces of the shuttle body.

As the above-mentioned automatic pushing type complementary food device further preferably: the oblong major axis diameter of the largest cross section of the feeding end is smaller than the diameter of the cross section of the mating section; a plurality of the overflow holes are distributed in one large and one small array on the upper and lower surfaces of the shuttle body, and the arc of the arc line formed by connecting the central points of each row of the overflow holes has the same arc as the arc shape of the baby teeth.

As the above-mentioned automatic pushing type complementary food device further preferably: a lifting ring is provided at the top of the clamping body, wherein two ends of the lifting ring are connected to the clamping body, and the diameter of the lifting ring is gradually increased from the two ends to the centre.

As the above-mentioned automatic pushing type complementary food device further preferably: the clamping body, the elastic member, the colander main body and the connecting piece are all made of liquid silica gel.

As the above-mentioned automatic pushing type complementary food device further preferably: the hardness of the connecting piece is greater than the hardness of the colander main body; the colander main body has the smallest hardness relative to the clamping body, the elastic member and the connecting piece.

It can be seen from the analysis that compared with the prior art, the advantages and beneficial effects of the present invention are: 1. When the automatic pushing type complementary food device of the present invention is in use, the elastic member compresses and stores energy. With the outflow of the complementary food, the complementary food in the complementary food cavity gradually decreases, and the elastic member in the compressed state gradually expands down and squeezes the inner space of the complementary food cavity, so that the remaining complementary food in the complementary food cavity can be collected and concentrated at the overflow holes for the baby to eat, so that the baby can eat the complementary food more easily and avoid the residual food. The characteristics of simple structure, convenient in operation, safe in use and good usage experience are achieved.

2. The wall thickness of the clamping body of the present invention is thickened at the air hole so as to ensure the permeability of the air hole; the diameter of the lifting ring of the clamping body is gradually increased from the two ends to the centre, which is convenient for the baby to grasp and reduce the weight, and convenient for the baby to use.
3. The clamping end and the free end of the elastic member of the present invention are connected via a toothed sidewall, so that deformation along the axial direction of the elastic member can occur at the toothed sidewall; the surface of the outer sidewall of the elastic member at the free end is a corrugated surface, which reduces the resistance to elongation of the elastic member and ensures the collection effect of the complementary food.
4. The colander main body of the present invention is movably connected or fixedly connected with the connecting piece, which can be either a split structure or an integrated structure, with rich and diverse designs; the structure of the feeding end is rich and diverse, which can meet the needs of babies of different ages; the feeding end has gutta-percha properties due to its grooves, which further enriches the baby's usage experience.
5. The clamping body, elastic member, colander main body and connecting piece of the present invention are all liquid silica gel, all of which can meet the food-grade requirements, and can ensure the safety of the baby and improve the baby's usage experience; the colander main body has the smallest hardness relative to the clamping body, the elastic member and the connecting piece, which can further improve the baby's taste experience.

BRIEF SPECIFICATION OF THE DRAWINGS

Figure 1:
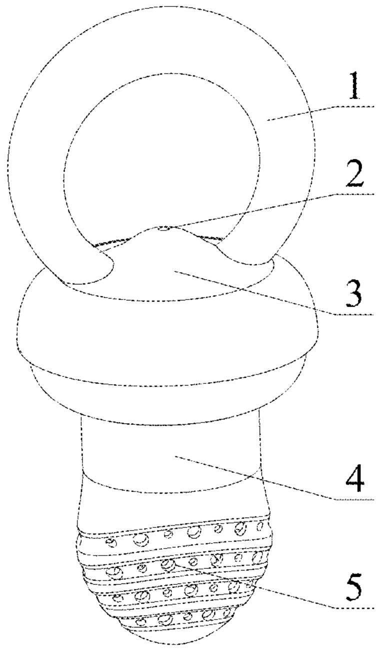
FIG. 1 is a structural schematic diagram of an embodiment of the present invention.
Figure 2:
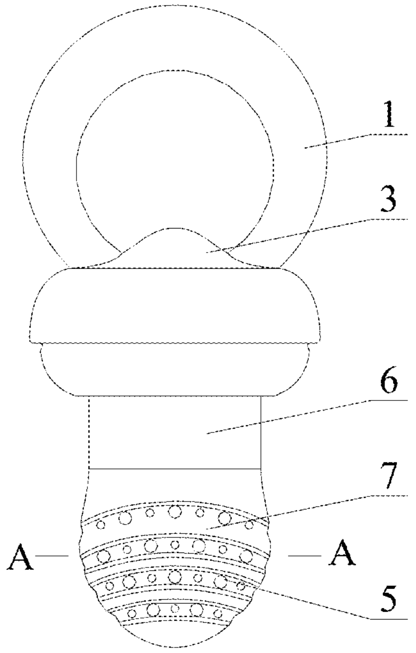
FIG. 2 is a front view of FIG. 1.

In the figures: 1, 31, 51—lifting ring; 2, 32, 52—air hole; 3, 33, 53—clamping body; 4, 34—colander; 5, 35, 55—overflow holes; 6, 36, 56—mating section; 7, 37, 57—feeding end; 8, 58—first clamping protrusion; 9, 59—second clamping protrusion; 10, 60—connecting piece; 11, 61—free end; 12, 62—corrugated surface; 13, 63—toothed sidewall; 14—coating end; 15, 65—cavity; 16—elastic member; 67—clamping end; 18—outer cover.

DETAILED SPECIFICATION OF THE EMBODIMENT

The technical solutions in the examples of the present invention will be clearly and completely described below with reference to the drawings in the examples of the present invention. Obviously, the described examples are only a part of the examples of the present invention, rather than all the examples. Based on the examples of the present invention, all other embodiments obtained by a person of ordinary skill in the art without inventive effort fall within the scope of the present invention.

In the specification of the present invention, the orientations or positional relationships indicated by the terms "longitudinal", "transverse", "upper", "lower", "front", "rear", "left", "right", "vertical", "horizontal", "top" and "bottom", etc. are based on the orientations or positional relationships shown in the drawings, and are only for the convenience of describing the present invention rather than requiring the present invention to be constructed and operated in a specific orientation, and therefore cannot be understood as limitations of the present invention.

Figure 3:
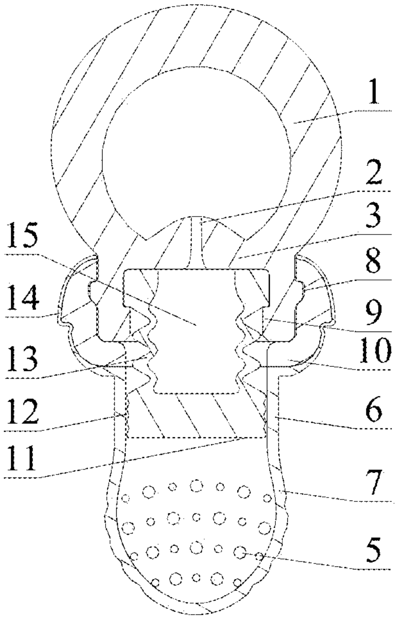
FIG. 3 is a cross-sectional view of FIG. 2.
Figure 4:
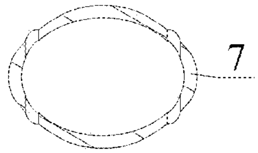
FIG. 4 is a sectional view at A-A of FIG. 2.
Figure 8:
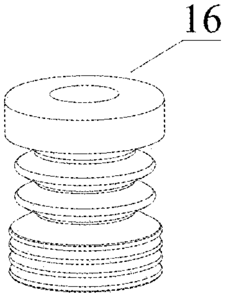
FIG. 8 is a structural schematic diagram of the elastic member.

As shown in FIGS. 1, 3 and 8, the present invention provides an automatic pushing type complementary food device mainly comprising the clamping body 3, the elastic member 16 and the colander 4, wherein the inner side of the clamping body 3 is connected to one end of the elastic member 16 in a clamped manner, the outer side of the clamping body 3 is connected to the colander 4 in a clamped manner, the other end of the elastic member 16 extends into the colander 4, the complementary food cavity is provided in the colander 4, and the overflow holes 5 are provided in the outer wall of the colander 4.

Specifically, when the automatic pushing type complementary food device of the present invention is in use, the elastic member 16 is installed on the clamping body 3, the complementary food cavity inside the colander 4 is filled with complementary food, and then the clamping body 3 is installed on the colander 4. At this time, since the complementary food cavity is filled with complementary food, the elastic member 16 is in a compressed state to store energy. When the baby sucks and bites the colander 4, the complementary food in the colander 4 flows out from the overflow hole 5 and is eaten by the baby. With the outflow of the complementary food, the complementary food in the complementary food cavity gradually decreases, and the elastic member 16 in the compressed state gradually expands down and squeeze the inner space of the complementary food cavity, and the inner space of the complementary food cavity becomes smaller, so that the remaining complementary food in the complementary food cavity can be collected and concentrated at the overflow holes 5 for the baby to eat, so that the baby can eat the complementary food more easily and avoid the residual food. The invention is simple in structure, convenient in operation, easy to clean, easy to assembly and use, automatically pushes and collects complementary food when the baby uses the device, free of the complicated operation of manual pushing by the mother, and can bring convenience to the mother during feeding. In addition, the present invention can achieve the automatic collection of the complementary food without a complex pushing structure, the complementary food is easy to eat, and the baby has a good experience. The invention has few parts and components, strong integrity, and it is not easy for the baby to accidentally eat it, the usage experience can be improved while the safety of the baby in use can be guaranteed, and the characteristics of simple structure, convenient in operation, safe in use and good usage experience are achieved.

As an optional realization form, the elastic member 16 of the present invention can be a cylinder made of liquid silica gel material; a metal spring can also be selected, and the outer wall of the metal spring is covered with a liquid silica gel layer by the encapsulation process, and the bottom surface of the liquid silica gel is set at the bottom of the metal spring by the encapsulation process. As an improvement, as shown in FIGS. 1 to 10, the present invention also provides the following solutions:

As shown in FIGS. 1, 3 and 8, the automatic pushing type complementary food device mainly comprising the clamping body 3, the elastic member 16 and the colander 4, wherein the inner side of the clamping body 3 is connected to one end of the elastic member 16 in a clamped manner, the outer side of the clamping body 3 is connected to the colander 4 in a clamped manner, the other end of the elastic member 16 extends into the colander 4; air hole 2 penetrating the clamping body 3 is provided on the clamping body 3, and a cavity 15 communicating with the air hole 2 is provided on the elastic member 16, the complementary food cavity is provided in the colander 4, and the overflow holes 5 are provided in the outer wall of the colander 4.

In order to facilitate the expansion and contraction of the elastic member 16, in the present invention, the air hole 2 is provided on the clamping body 3 and the cavity 15 is provided on the elastic member 16. In use, the elastic member 16 is installed on the clamping body 3, the complementary food cavity inside the colander 4 is filled with the complementary food, and then the clamping body 3 is installed on the colander 4. At this time, since the complementary food cavity is filled with the complementary food, the elastic member 16 is in a compressed state to store energy, and the cavity 15 of the elastic member 16 is compressed and deformed to be reduced. When the baby sucks and bites the colander 4, the complementary food in the colander 4 flows out from the overflow hole 5 and is eaten by the baby. With the outflow of the complementary food, the complementary food in the complementary food cavity gradually decreases, the elastic member 16 in the compressed state gradually expands down, and the shape of the cavity 15 reduced due to the compression deformation gradually recovers. In order to compensate for the pressure drop caused by the expansion of the elastic member 16, the air hole 2 on the clamping body 3 enter the air. The elastic member 16 gradually extends down to squeeze the inner space of the complementary food cavity, and the inner space of the complementary food cavity becomes smaller, so that the complementary food remaining in the complementary food cavity can be collected, and concentrated at the overflow holes 5 for the baby to eat, so that the baby can eat the complementary food more easily and avoid the residue of the complementary food.

Furthermore, in order to ensure the use effect of the elastic member 16, as shown in FIGS. 1, 3 and 8, the clamping body 3 of the present invention is a cylinder structure with the top cover provided at the top and the opening provided at the bottom thereof, the arc-shaped protrusion and the air hole 2 are provided at the axis of the cylinder structure, and the wall thickness of the top cover at the air hole 2 is greater than the wall thickness at the periphery of the air hole 2. The top of the top cover of the present invention is provided with the arc-shaped protrusion, and the bottom of the top cover can be an arc-shaped surface or a plane, so as to ensure that the wall thickness at the air hole 2 is greater than the wall thickness at the periphery of the air hole 2, namely, the wall thickness of the clamping body 3 at the air hole 2 is thickened, and the air hole 2 is not easily bent and deformed during use, so that the permeability of the air hole 2 can be ensured, thereby ensuring the gas compensation for the elastic member 16 during use, and further ensuring the use effect of the elastic member 16.

Furthermore, in order to facilitate the use of the baby, as shown in FIGS. 1 and 3, the clamping body 3 of the present invention is provided with a lifting ring 1 at the top thereof, so that the baby can be grasped by one or both hands during use. Preferably, the two ends of the lifting ring 1 are located on the two sides of the protrusion and are connected to the clamping body 3, the diameter of the lifting ring 1 gradually is gradually increased from the two ends to the centre, and the lifting ring 1 is thickened in the centre that mainly for the grasp of baby to ensure the use feel of the baby, and the diameter of the lifting ring 1 gradually decreases at the two ends of the lifting ring 1, so that the weight of the lifting ring 1 can be simplified and the use of the baby can be further facilitated.

Furthermore, in order to ensure the firmness of the connection of the present invention, as shown in FIG. 3, the outer side of the clamping body 3 of the present invention is provided with a first clamping protrusion 8, the cross section of which is a right-angled trapezoid, and the oblique side of the right-angled trapezoid is located below the right-angled side, so as to facilitate the insertion of the clamping body 3 into the colander 4 and clamping at the inner wall of the colander 4.

Furthermore, as shown in FIGS. 3 and 8, the inner side of the clamping body 3 of the present invention is provided with a second clamping protrusion 9, the cross section of which is a right-angled trapezoid, and the oblique side of the right-angled trapezoid is located below the right-angled side. When designed, the first clamping protrusion 8 of the present invention is located above the second clamping protrusion 9, so that the arrangement positions of the first clamping protrusion 8 and the second clamping protrusion 9 can be staggered, facilitating the manufacture and installation of the clamping body 3. Preferably, the inner diameter of the clamping body 3 at the second clamping protrusion 9 is smaller than the inner diameter of the colander 4, so that the elastic member 16 is elastically deformed.

Furthermore, in order to facilitate the installation and deformation of the elastic member 16, as shown in FIGS. 3 and 8, one end of the elastic member 16 of the present invention provided with a cavity 15 is a clamping end, and the clamping end is clamped on the clamping body 3 so as to facilitate assembly; the other end of the elastic member 16 is a free end 11 for squeezing and collecting the complementary food. The clamping end is connected to the free end 11 via the toothed sidewall 13, facilitating the deformation of the elastic element 16. When the elastic member 16 is squeezed, the toothed sidewall 13 is compressed by being squeezed to be wrinkled, and gradually recovers deformation as the pressing force decreases. Preferably, the outer tip thickness of the toothed sidewall 13 of the present invention is greater than the inner tip thickness for ease of manufacturing.

Furthermore, in order to reduce the deformation resistance of the elastic member 16 and ensure the collection effect of the residual complementary food, as shown in FIGS. 3 and 8, the outer sidewall surface of the free end 11 of the elastic member 16 of the present invention is the corrugated surface 12, and the top end of the corrugated surface 12 is adhered to the inner wall of the colander 4, thereby reducing the resistance to the elongation of the elastic member 16 and ensuring the collection effect of the complementary food during the elongation of the elastic member 16.

Figure 10:
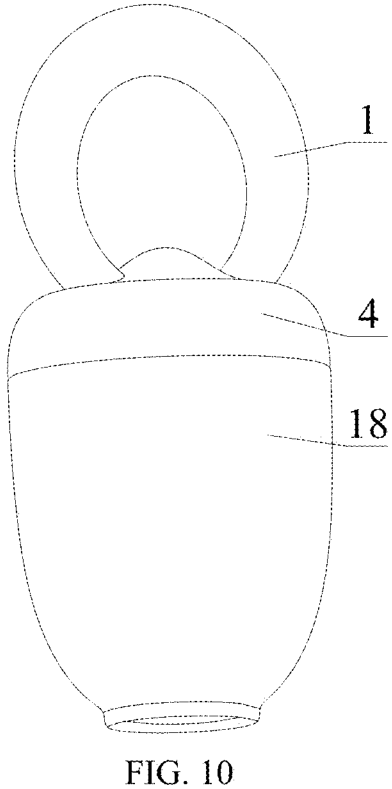
FIG. 10 is an installation schematic diagram of the present invention.

Furthermore, in order to ensure the cleaning of the colander 4 and facilitate the storage, as shown in FIG. 10, the present invention further comprises an outer cover 18, the bottom of the outer cover 18 is provided with a base, and the outer cover 18 is sleeved on the outer side of the colander 4 and is connected to the colander 4 so as to facilitate the storage of the present invention and ensure the cleaning of the colander 4.

Figure 9:
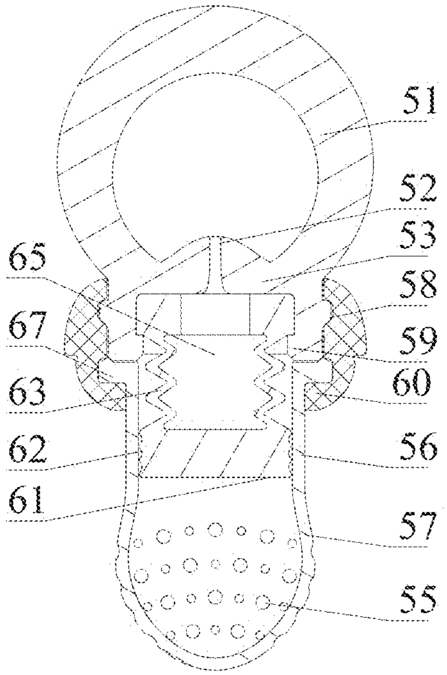
FIG. 9 is a cross-sectional view of another embodiment of the present invention.

Furthermore, as shown in FIGS. 3, 8 and 9, the colander 4 of the present invention comprises the colander main body and a connecting piece (10, 60), the connecting piece (10, 60) is in clamping fit with the clamping body (3, 53) to facilitate the installation of the clamping body (3, 53) on the colander 4. In order to enrich the selection of the structure of the colander 4, the main body of the colander is movably connected or fixedly connected to the connecting piece (10, 60), which may be a split structure or an integrated structure. The colander main body comprises a matching section (6, 56) and a feeding end (7, 57); the mating section (6, 56) is a rotary body for accommodating the elastic member 16 and sliding mate with the elastic member 16; the feeding end (7, 57) is a shuttle body with an oblong cross section, and the shape of the cross section is the same as that of the baby when the mouth is opened, so as to facilitate the baby to use, and the overflow holes (5, 55) are provided on the feeding end (7, 57), so as to be able to overflow the baby with complementary food.

The clamping body (3, 33, 53), the elastic member 16, the colander main body and the connecting piece (10, 60) of the present invention are all liquid silica gel, which can meet food-grade requirements, are safe and reliable in materials, and can be sucked and bit by the baby during use, so as to ensure the safety of the baby during use and improve the usage experience of the baby. As a preferred embodiment, the hardness of the connecting piece (10, 60) is greater than the hardness of the colander main body, facilitating assembly and ensuring the firmness of the connection; the colander body has the smallest hardness relative to the clamping body (3, 33, 53), the elastic member 16 and the connecting piece (10, 60), which can further improve the taste experience of the baby.

As an example of the present invention, as shown in FIG. 9, the colander main body is movably connected, preferably clamped, to the connecting piece 60. In the design, the colander main body and the connecting piece 60 are of a split-type design, and the colander main body further comprises a clamping end 67, wherein the clamping end 67 is connected to the mating section 56, and the clamping end 67 is clamped the inner side of the connecting piece 60. When in use, the clamping end 67 is clamped on the inner side of the connecting piece 60, that is to say, the colander main body is mounted on the connecting piece 60; at the time of cleaning, it is possible to separate the colander main body from the connecting piece 60, thereby performing cleaning separately.

As yet another example of the present invention, as shown in FIG. 3, the colander main body is fixedly connected, preferably encapsulated, to the connecting piece 10. In design, the colander main body further comprises a coating end 14, wherein the clamping end 14 is connected to the mating section 6 for connection to the connecting piece 10. The coating end 14 is coated on the outer side of the connecting piece 10, and is integrally arranged with the connecting piece 10 using an encapsulation process. After the colander 4 is formed, the colander main body and the connecting piece 10 are formed as a integrated structure, so that the number of parts of the colander 4 can be reduced and the assembly and use can be facilitated.

In order to adapt to babies of different ages, as shown in FIGS. 1 to 7, the structure of the feeding end (7, 37) of the present invention is rich and diverse, and can meet the needs of babies of different ages.

Figure 5:
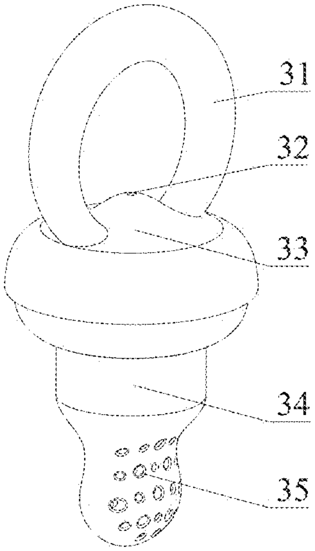
FIG. 5 is a structural schematic diagram of another embodiment of the present invention.
Figure 6:
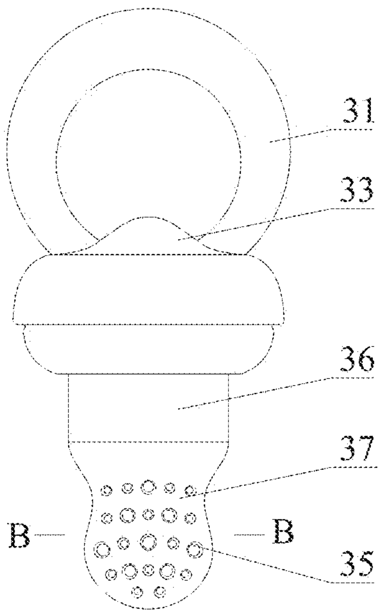
FIG. 6 is a front view of FIG. 5.
Figure 7:
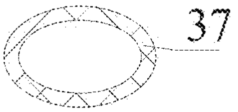
FIG. 7 is a sectional view at B-B of FIG. 6.

As an example of the present invention, as shown in FIGS. 5 to 7, the oblong major axis diameter of the largest cross-section of the feeding end 37 of the present invention is smaller than the diameter of the cross-section of the mating section 36, that is, the shape of the feeding end 37 is smaller than that of the mating section 36, and the feeding end 37 is easier to enter because of its small shape, which is convenient for young babies (4 to 7 months old).

Furthermore, in the present example, the sidewall of the feeding end (7, 37, 57) is arranged with a plurality of annular recesses which are in conformity with the arc of the baby teeth, and the surface of the annular recesses is arc-shaped, so as to add the property of gutta-percha to the colander 4 and further enrich the usage experience of the baby. In the design, a plurality of overflow holes (5, 35, 55) are located in the annular recesses, and are distributed in one large and one small array along the annular recesses on the upper and lower surfaces of the shuttle body so as to uniformly overflow the complementary food.

As a further example of the present invention, as shown in FIGS. 1 to 4, the oblong major axis diameter of the largest cross-section of the feeding end 7 of the present invention is greater than the diameter of the cross-section of the mating section 6, that is, the shape of the feeding end 7 is greater than that of the mating section, and is able to increase the volume of the complementary food cavity, suitable for use by older babies (older means relative to younger babies).

Furthermore, in the present example, a plurality of overflow holes (5, 35, 55) are distributed in one large and one small array on the upper and lower surfaces of the shuttle body, and the arc formed by connecting the central points of each row of overflow holes (5, 35, 55) has the same arc as the same arc as that of the baby teeth, so as to comply with the baby's eating habits.

It is known from the technical common sense that the present invention can be realized by other embodiments without departing from its spirit or essential characteristics. Accordingly, the above-disclosed embodiments are, in all respects, illustrative and not exclusive. All changes within the scope of the present invention or within the scope equivalent to the present invention are encompassed by the present invention.

What is claimed is:

1. An automatic pushing type complementary food device comprising a clamping body, an elastic member and a colander, wherein an inner side of the clamping body is connected to one end of the elastic member in a clamped manner, an outer side of the clamping body is connected to the colander in a clamped manner, the other end of the elastic member extends into the colander, a complementary food cavity is provided in the colander, and overflow holes are provided in an outer wall of the colander, an air hole penetrating the clamping body is provided on the clamping body, and a cavity communicating with the air hole is provided on the elastic member, one end of the elastic member provided with the cavity is a clamping end, the other end of the elastic member is a free end, a surface of an outer sidewall of the free end of the elastic member is a corrugated surface, and a top end of the corrugated surface is adhered to an inner wall of the colander, characterized in that, the colander includes a colander main body and a connecting piece, the connecting piece is in clamping fit with the clamping body, the colander main body is movably connected or fixedly connected with the connecting piece; the colander main body includes a mating section and a feeding end; the mating section is a rotary body for sliding mate with the elastic member; the feeding end is a shuttle body with an oblong cross section, and a sidewall is provided with the overflow holes for overflowing complementary food, oblong major axis diameter of the largest cross section of the feeding end is greater than diameter of cross section of the mating section; and the sidewall of the feeding end is arranged with a plurality of annular recesses which are in conformity with arc shape of baby teeth, surface of the annular recesses is arc-shaped, and the overflow holes are located in the annular recesses, and distributed in one large and one small array along the annular recesses on upper and lower surfaces of the shuttle body.

2. An automatic pushing type complementary food device comprising a clamping body, an elastic member and a colander, wherein an inner side of the clamping body is connected to one end of the elastic member in a clamped manner, an outer side of the clamping body is connected to the colander in a clamped manner, the other end of the elastic member extends into the colander, a complementary food cavity is provided in the colander, and overflow holes are provided in an outer wall of the colander, an air hole penetrating the clamping body is provided on the clamping body, and a cavity communicating with the air hole is provided on the elastic member, one end of the elastic member provided with the cavity is a clamping end, the other end of the elastic member is a free end, a surface of an outer sidewall of the free end of the elastic member is a corrugated surface, and a top end of the corrugated surface is adhered to an inner wall of the colander, characterized in that, the colander includes a colander main body and a connecting piece, the connecting piece is in clamping fit with the clamping body, the colander main body is movably connected or fixedly connected with the connecting piece; the colander main body includes a mating section and a feeding end; the mating section is a rotary body for sliding mate with the elastic member; the feeding end is a shuttle body with an oblong cross section, and a sidewall is provided with the overflow holes for overflowing complementary food, oblong major axis diameter of the largest cross section of the feeding end is smaller than diameter of cross section of the mating section; the overflow holes are distributed in one large and one small array on upper and lower surfaces of the shuttle body, and arc of arc line formed by connecting central points of each row of the overflow holes has the same arc as arc shape of baby teeth.

* * * * *